United States Patent [19]
van der Lely

[11] 4,036,154
[45] July 19, 1977

[54] SOIL CULTIVATING IMPLEMENTS

[76] Inventor: Cornelis van der Lely, 7 Bruschenrain, Zug, Switzerland

[21] Appl. No.: 540,444

[22] Filed: Jan. 13, 1975

[30] Foreign Application Priority Data

Jan. 18, 1974 Netherlands .......................... 7400690

[51] Int. Cl.² ............................................. A01B 33/00
[52] U.S. Cl. ..................................... 111/10; 172/396; 172/59
[58] Field of Search .......................... 111/1, 83, 14–69, 111/85; 172/59, 111–112, 548, 556, 396

[56] References Cited

U.S. PATENT DOCUMENTS

| | | | |
|---|---|---|---|
| 2,656,951 | 10/1953 | Murphy | 111/66 X |
| 3,062,159 | 11/1962 | Sorenson et al. | 111/85 |
| 3,200,778 | 8/1965 | Whelchel | 111/85 |
| 3,335,681 | 8/1967 | Main et al. | 111/64 |
| 3,411,467 | 11/1968 | van der Lely et al. | 111/54 |
| 3,627,050 | 12/1971 | Hansen et al. | 111/77 |
| 3,701,327 | 10/1972 | Krumholz | 111/85 X |
| 3,774,689 | 11/1973 | van der Lely et al. | 172/112 |
| 3,826,314 | 7/1974 | van der Lely et al. | 172/59 |
| 3,885,633 | 5/1975 | van der Lely et al. | 172/59 X |
| 3,899,029 | 8/1975 | van der Lely et al. | 172/59 X |

Primary Examiner—Robert E. Bagwill
Attorney, Agent, or Firm—Mason, Mason & Albright

[57] ABSTRACT

A rotary harrow or cultivator has a first frame portion linked to a second frame portion. The second frame portion supports rotary soil working members and a roller is adjustably connected to the rear of the second frame portion to govern the working depths of the soil working members. The first frame portion has forward coupling means for connection to a three-point lift at the rear of a tractor. The first and second frame portions are linked to one another with a parallelogram linkage and movable relative to one another during travel. Supporting ground wheels are connected to the first portion via arms and bear on the ground to the rear of the roller to avoid overloading the roller with weight. A delivery mechanism is supported on the implement with delivery tubes extending downwardly to pivot connections on the roller supports.

10 Claims, 4 Drawing Figures

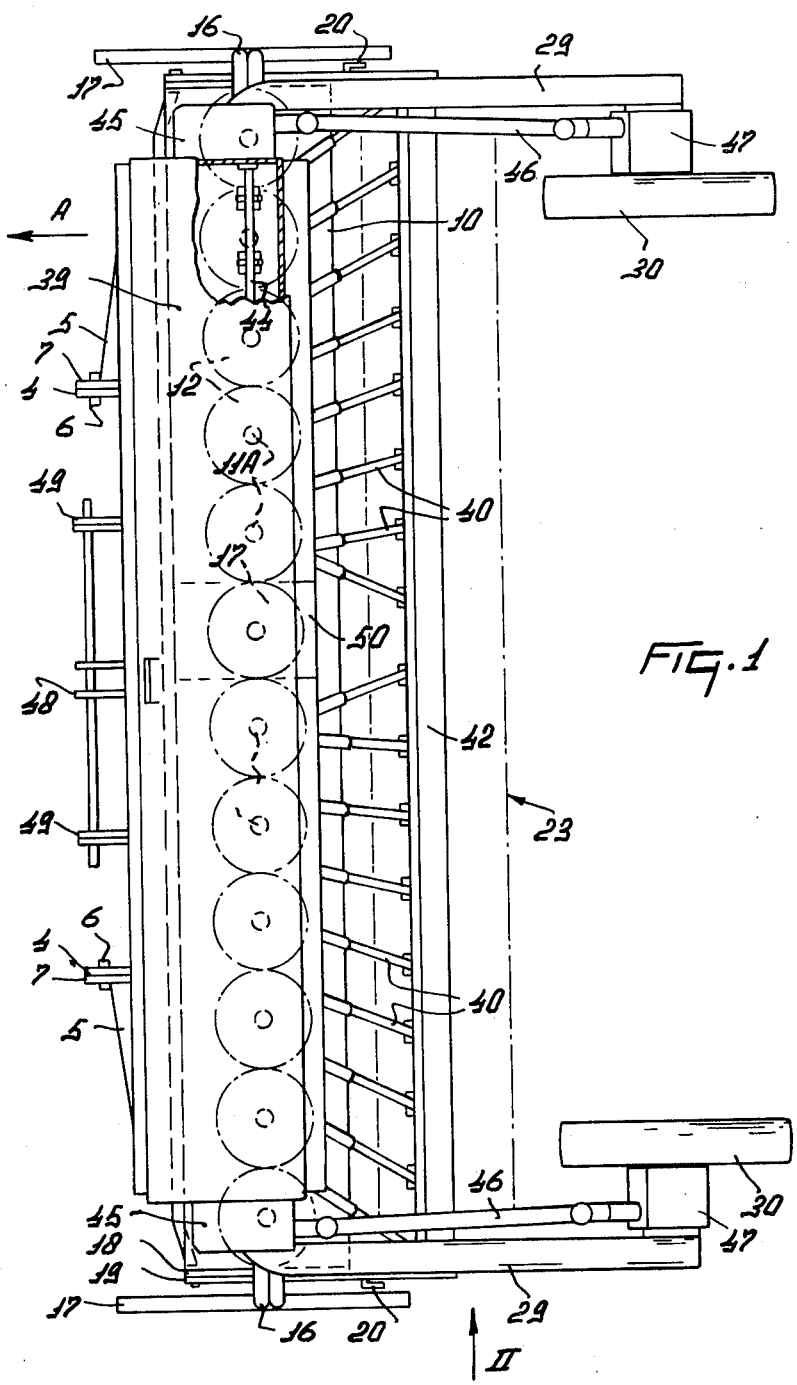

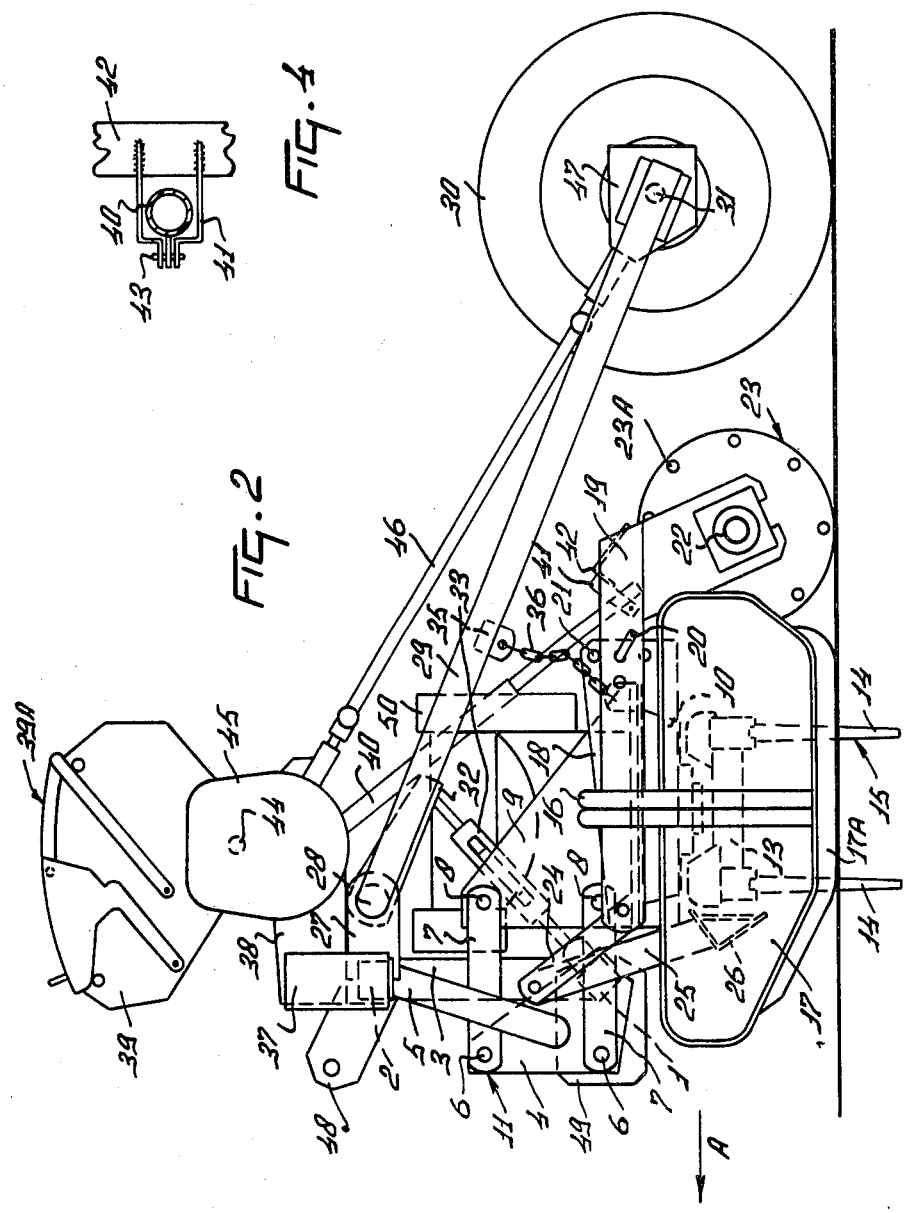

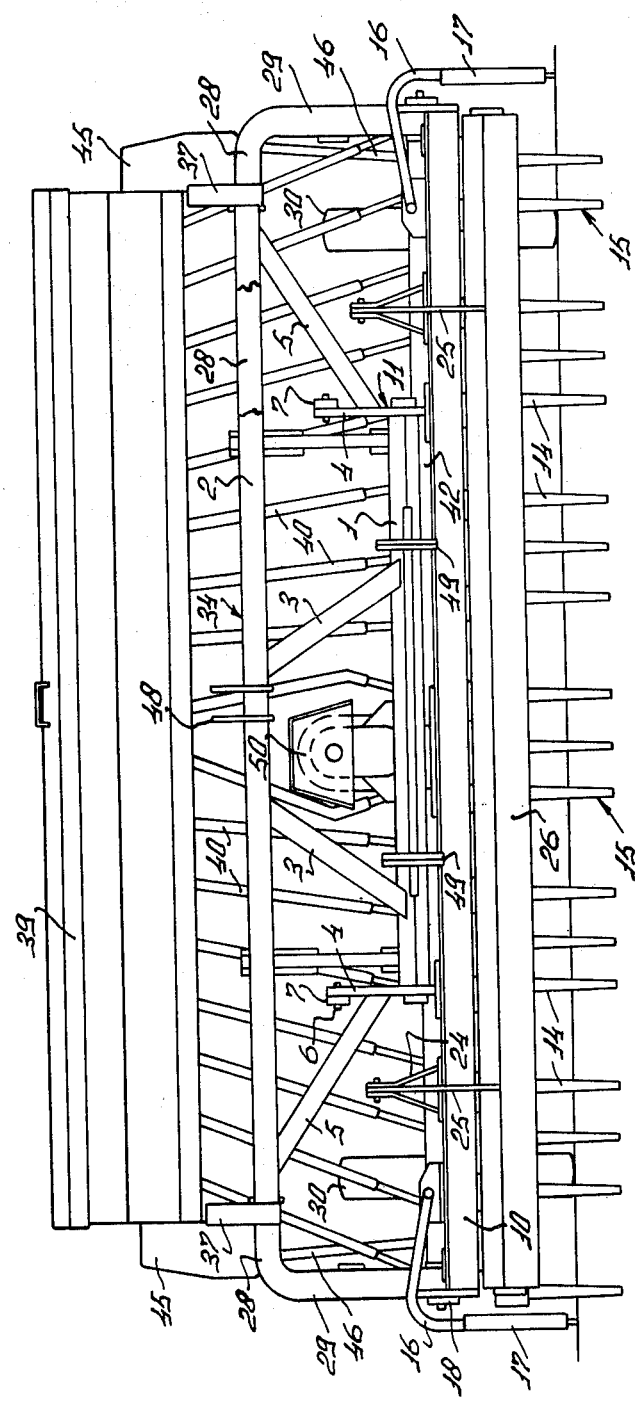

SOIL CULTIVATING IMPLEMENTS

For better understanding of the invention, and to show how the same may be carried into effect, reference will now be made, by way of example, to the accompanying drawings, in which:

FIG. 1 is a plan view of a rotary harrow in accordance with the invention,

FIG. 2 is a side elevation, to an enlarged scale, as seen in the direction indicated by an arrow II in FIG. 1, FIG. 3 is a front elevation of the harrow of FIGS. 1 and 2, FIG. 4 is a part-sectional scrap view, to an enlarged scale, illustrating details of a support for a delivery tube of a mechanism that is carried by the harrow for delivery material onto and/or into the soil that is worked by the harrow during its operation.

Referring to the drawings, the machine that is illustrated is a rotary harrow that may also be considered as being a soil cultivating implement. The harrow has two frame beams 1 and 2 that are disposed one above the other in substantially parallel relationship with each beam extending substantially horizontally perpendicular to the intended direction of straight forward operative travel of the harrow which is indicated by an arrow A in FIGS. 1 and 2 of the drawings. The lower frame beam 1 is considerably shorter than the upper frame beam 2 which latter beam projects laterally beyond the opposite ends of the frame beam 1 by equal distances (see FIG. 3 of the drawings). The frame beams 1 and 2 are rigidly interconnected by two struts 3 that are disposed in upwardly convergent relationship towards the frame beam 2. Substantially vertical support plates 4 are rigidly secured to the opposite ends of the frame beam 1 and further struts 5 rigidly interconnect those support plates and locations close to the opposite ends of the upper frame beam 2, the struts 5 being in upwardly divergent relationship from the support plates 4 to the frame beam 2. Upper and lower region of both of the support plates 4 carry stub shafts 6 arranged in substantially horizontally aligned upper and lower pairs which define two axes that are substantially parallel to the longitudinal axes of the frame beams 1 and 2. Four arms 7 that extend rearwardly from the stub shafts 6 with respect to the direction A are upwardly and downwardly turnable about those stub shafts, the rear ends of the four arms 7 being pivotally connected by corresponding further stub shafts 8, that are parallel to the stubshafts 6, to upper and lower regions of the fronts of brackets 9. The brackets 9 are secured to the top of a hollow box-shaped frame portion 10 that extends substantially horizontally parallel to the frame beam 1 and 2 throughout substantially the whole of the width of the rotary harrow. It will be apparent from the drawings, and particularly from FIG. 2 thereof, that the frame portion 10 is connected to the frame beams 1 and 2 by a dual parallelogram linkage that is generally indicated by the reference 11, said linkage being constructed and arranged in such a way that the parts which have just been mentioned can move upwardly and downwardly relative to one another without significant tilting.

The frame portion 10 is provided at regular intervals of not more than 30 centimeters, and preferably substantially 25 centimeters, along its length with substantially vertical shafts 11A that are thus arranged in a single row which is transverse to the direction A in regularly spaced apart side-by-side relationship. The shafts 11a are rotatably mounted in of the frame portion 10 by ball bearings and are provided, inside the hollow frame portion 10, with corresponding straight- or spur-tooth pinions 12. In the embodiment which is being described, there are 12 of the shafts 11A, and thus 12 of the pinions 12, each pinion 12 being arranged in such a way that its teeth are in mesh with those of its neighbour, or each of its neighbours, in the single row thereof. Lower ends of the shafts 11A project from beneath the frame portion 10 and each such shaft 11A carries a corresponding substantially horizontal tine support 13 whose opposite ends carry tine holders in which upper fastening portions of soil-working tines 14 are firmly, but releasably, secured. Each pair of tines 14, together with the corresponding tine holds and tine support 13, constitute a rotary soil working member that is generally indicated by the reference 15. The 12 soil working member 15 revolve around the axes of the corresponding shafts 11A, to which they are secured, during the use of the harrow and, due to the intermeshing arrangement of the corresponding pinions 12 that has been described above, each soil working member 15 will revolve in a direction that is opposite to the direction of rotation of its neighbour, or each of its neighbours, in the single row thereof. The distance between the active or soil working portions of the two tines 14 of each soil working member 15 is greater than the distance between the axes of rotation of negihbouring shafts 11A so that the 12 soil working members 15 work corresponding strips of grund that overlap one another to produce, in effect, a single broad strip of working soil. the angular dispositions of the tine supports 13 about the axes of the shafts 11A are staggered in respect of neighbouring soil working members 15 so that the operating arrangement which has just been described does not produce collision fouling between the soil working members 15 when they are in rotation.

Arms 16 are turnably and downwardly at opposite ends of the hollow frame portion 10 about pivots which define axes that are substantially parallel to the direction A and that are located a short distance inwardly from the opposite ends of said frame portion 10 on top of the latter (see FIG. 3 of the drawings). The upwardly and downwardly turnable arms 16 carry screening plates 17 whose shapes can be seen in FIGS. 2 and 3 and whose lowermost edge regions 17A slide over the surface of the soil during the operation of the harrow. The screening plates 17 occupy substantially the positions thereof that are illustrated in the drawings during the operation of the harrow and serve partly to minimize ridging of the soil at the edges of the single broad strip of ground that is worked by the harrow and partly to guard against stones and other potentially harmful objects being flung laterally of the harrow by its rapidly rotating tines 14. The opposite ends of the hollow frame portion 10 carry substantially vertically disposed plates 18 that are formed as sector plates. Arms 19 are turnable upwardly and downwardly alongside the two sector plates 18 about a substantially horizontal axis that is defined by strong pivots which are located at the tops and fronts of the sector plates 18 with respects to the direction A, said arms 19 extending rearwardly from the pivots that have just been mentioned with respect to the direction A. Rear edge regions of the sector plates 18 are formed with holes 21 that are equidistant from the pivotal axis of the arms 19 and said arms are formed with single holes that can be brought into register with chosen holes 21 to receive substantially horizontal locking pins 20, or equivalent bolts or the like, to retain the arms 19 in angular settings about their pivotal connections with the frame portion 10 that correspond to the selected holes 21. The rearmost ends of the arms 19 with respect to the direction A have downwardly directed portions whose lower ends carry substantially horizontally aligned bearings 22. A rotatable supporting member in the form of an open ground roller 23 is mounted between the bearings 22 so as to be rotatable about its own longitudinal axis. The rotatable supporting member that is afforded by the ground roller 23 can be moved upwardly and downwardly relative to the frame portion 10 by adjusting the angular settings of the arms 19 with the aid of the locking pins 20 or equivalent bolts or the like and serves the principal function of governing the depth of penetration of the tines 14 into the soil during the operation of the harrow. The ground roller 23 extends throughout substantially the whole of the working width of the harrow and serves the additional function of crushing any insufficiently crumbled lumps of soil that may have been thrown rearwardly by the tines 14 the roller has a plurality, such as eight, of elongated elements 23A which constitute the circumference of the basically cylindrical roller 23 and are arranged in regularly spaced apart relationship around the axis of rotation of that roller. The elongated elements 23A are preferebly, but not essentially, wound helically around the axis of rotation of the roller 23.

Two upwardly and forwardly (with respect to the direction A) inclined supporting brackets 24 (see FIGS. 2 and 3 of the drawings) are provided at the front of the frame portion 10 at locations that are well spaced apart from one another laterally of the direction A. Arms 25 are turnably connected to the upper leading ends of the supporting brackets 24 by substantially horizontally aligned pivot pins and, as will be seen in FIG. 2 of the drawings, the arms 25 are normally inclined downwardly, and rearwardly to a small extent with respect to the direction A, from their pivotal mountings towards the soil working member 15. The lower and rearmost ends of the arms 25 are rigidly interconnected by a screening element 26 that is afforded principally by a rigid bar or beam of the L-shaped cross-section, said screening element 26 extending throughout the working width of the harrow at the horizontal level of the tine supports 13 and just in front of the soil working members 15 with respect to the direction A. Springs 25A urge the arms 25 about their pivotal mountings in an anticlockwise direction as seen in FIG. 2 against stops and the screening element 26 thus normally maintains the illustrated position in which it guards the upper fastening portions of the tines 14 and the parts to which they are secured against damage by stones and the like. Should such an object become jammed between one of the tine holders and the rear of the screening element 26, that screening element can yield forwardly, against the action of the springs that have been mentioned above, until the object is displaced by the continued rotation of the member 15 thus avoiding damage or reducing it to an insignificant minimum in almost every case.

Strong lugs 27 project rearwardly from the frame beam 2 adjacent the opposite ends thereof and a tube 28 is turnable journalled in openings at the rear ends of said lugs 27. The tube 28 is bent over perpendicularly just beyond the lugs 27 to form tubular arms 29 that are inclined downwardly and rearwardly with respect to the direction A from the lugs 27 (see FIG. 2). The lowermost and rearmost end of each tubular arm 29 carries a corresponding substantially horizontal axle 31 and two rotary supporting members in the form of ground wheels 30 are mounted the corresponding axles 31. The tube 28 is provided, at locations spaced apart from its center, with two pairs of lugs 32 in each of which pairs the corresponding lugs 32 are spaced apart from one another. One end of a link 33 of adjustable length is pivotally mounted between each pair of lugs 32 and the opposite end thereof is pivotally connected to the frame beam 1 near the corresponding end of that frame beam. The adjustable links 33 constitute a setting mechanism with the aid of which the tubular arms 29 and the ground wheels 30 can be set, and retained in, corresponding angular settings about a longitudinal axis of the tube 28 relative to a first portion 34 of the harrow frame that is intended for coupling to the three-point lifting device or hitch of an operating tractor or other vehicle and which portion includes the frame beams 1 and 2 and the struts 3 and 5. Each arm 29 is provided on its lower surface at a location near the midpoint of that arm with a downwardly directed lug 35 to one end of which a corresponding chain 36 is connected. The opposite ends of the two chains 36 are connected to lugs at the top and rear of the second frame portion 10 with respect to the direction A.

Upright bars 37 L-shaped cross-section are fastened to the opposite ends of the frame beam 2 and carry rearwardly extending brackets 38 that afford support for a hopper 39. The hopper 39 forms part of a mechanism 39A for applying material onto and/or into the soil and is located substantially vertically above the box-shaped frame portion 10 with its longitudinal axis in substantially parallel relationship with the frame beams 1 and 2. The hopper 39 may contain materials such as seeds, powdered or granular fertilisers and the like. A plurality, such as seventeen, of delivery tubes 40 open into the bottom of the hopper 39 at intervals along the transverse length thereof, said delivery tubes 40 being of telescopic construction and being arranged so that they are inclined downwardly, and rearwardly with respect to the direction A to some extent, from top to bottom. The delivery tubes are arranged in side-by-side relationship and each of them is held, near its lowermost and rearmost end, in a corresponding forked supporting bracket 41, the seventeen or other number of brackets 41 all being carried by a common support bar 42 of L-shaped cross-section that interconnects upper and rear regions of the two arms 19. In order that each delivery tube 40 should be movable to some extent with respect to the corresponding forked supporting bracket 41, one side of each tube 40 is provided, in the region of the corresponding bracket 41, with a projecting lug and that lug is pivotally mounted between limbs of the brackets 41 concerned by a corresponding pivot pin 43. The pivot pins 43 extend substantially horizontally parallel to the beams 1 and 2 and are located in front of the delivery tubes 40 with respect to the direction A (see FIG. 4 of the drawing). It will be evident from FIG. 4 of the drawings that each delivery tube 40 is not only turnable to some extent about the corresponding pivot pin 43 but is also movable laterally to a limited extent in a direction substantially parallel to the longitudinal axis of the corresponding pin 43. A rotatable delivery member 44 is disposed inside a lower region of the hopper 39 just above the connections of the delivery tubes 40 to that hopper. The rotatable delivery member 44 comprises a central shaft carrying a plurality of feeder members for supplying material from the hopper 39 to the tubes 40 at a controlled rate, the central shaft projecting outwardly beyond the opposite lateral ends of the hopper 39. The opposite ends of the central shaft of the rotatable delivery member 44 are located in corresponding gear boxes 45 which contain bevel pinions or other transmission members that place said shaft in driven connection with telescopic transmission shafts 46 having universal joints at their opposite ends. The ends of the shafts 46 that are remote from the gear boxes 45 are driven from the output shafts of two gear boxes 47 that are located between the ground wheels 30 and the corresponding arms 29. Input shafts of the two gear boxes 47 are coaxial with, or are afforded by, the wheel axles 31 and it will be realised that the arrangement is such that rotation of the ground wheels 30 as a result of progress of the harrow over the ground causes rotation of the delivery member 44 in the hopper 39 at a speed which is directly proportional to the rate of travel of the harrow. It has previously been mentioned that the first frame portion 34 is provided with means for coupling the harrow to the three-point lifting device or hitch of an agricultural tractor or other operating vehicle and it will now be noted that said means comprises a pair of upper lugs 48 fastened to the frame beams 2 for connection to the upper adjustable lifting link of such a three-point lifting device or hitch and two horizontally spaced apart lugs 49 carried by the frame beam 1 for co-operation with the two lower lifting links with the aid of a substantially horizontal pivot shaft as illustrated in outline in the drawings.

In the use of the rotary horrow that has been described, its first frame portion 34 is connected to the three-point lifting device or hitch of an agricultural tractor or other operating vehicle in a manner which is known per se employing the lugs 48 and 49 for that purpose. The frame portion 34 is thus supported by the agricultural tractor or other operating vehicle but also by the large ground wheels 30 whose levels relative to the frame portion 34 are set by appropriate manipulations of the adjustable links 33. A gear box 50 is arranged on top of the second frame portion 10 above one of the center pair of soil working members 15 and said gear box 50 has a forwardly projecting rotary input shaft that is placed in driven connection with the power take-off shaft of the agricultural tractor or other operating vehicle, to which the frame portion 34 is coupled, by way of an intermediate telescopic transmission shaft having universal joints at its opposite ends. Bevel pinions or other transmission members within the gear box 50 place the rotary input shaft thereof in driving connection with an upward extension of the shaft 11A that corresponds to the soil working member 15 above which the gear box 50 is located and, accordingly, the application of rotary drive to the input shaft of the gear box 50 causes all of the soil working members 15 to rotate in the manner discussed above which is such, it will be remembered, that each member 15 revolves in a direction which is opposite to that of its neighbour, or each of its neighbours, in the single row thereof. The depth of penetration of the tines 14 into the soil is controlled by setting the roller 23 at an appropriate level relative to the second frame portion 10 with the aid of the arms 19 and the locking pins 20 or equivalent bolts or the like in the manner that has been described above. It will be remembered that the frame portion 10 and the soil working members 15 that are connected thereto can move upwardly and downwardly independently of the first frame portion 34 by virtue of the dual parallelogram linkage 11 by which the frame portion 10 is connected to the frame portion 34. The hopper 39 has a lid or cover which can be opened to insert a supply of seeds, fertiliser or some other material that it may be desired to add to the soil at the same time as that soil is cultivated or harrowed by the tines 14 and the roller 23. As discussed above, progress of the harrow over the ground causes rotation of the large ground wheels 30 at a corresponding speed and this rotation is transmitted to the delivery member 44 within the hopper 39 thus causing the material within the hopper to be fed to the delivery tubes 40 at a rate that is directly proportional to the speed of travel over the ground of the harrow. The delivery tubes 40 open above the ground roller 23 and material from the hopper 39 is accordingly left on, or just beneath, the surface of the soil that has been worked by the foregoing tines 14 and that is subsequently lightly compressed by the roller 23. The pivotable connection of the delivery tubes 40 to the bar 42 protects those tubes against being bent or otherwise deformed at times when the second frame portion 10 and the roller 23 are moving upwardly or downwardly relative to the first frame portion 34.

When the harrow is to be transported from one place to another without performing any operation, it is lifted clear of the ground by raising the links of the three-point lifting device or hitch of the agricultural tractor or other operating vehicle to which the harrow is connected. The frame portion 10 and the roller 23 are prevented from turning too far downwardly relative to the frame portion 34 under these circumstances by the chains 36 which become taut under the action of gravity. This arrangement is apparent from a study of FIG. 2, in particular, of the drawings. The construction which has been described and which is illustrated in the accompanying drawings ensures that the weight of the first frame portion 34 that is directly connected to the operating agricultural tractor or other vehicle and the weight of any other mechanisms that may be carried on that frame portion, such as the described and illustrated mechanism for applying material onto and/or into the soil, will not excessively load the rotatable supporting member that is afforded by the ground roller 23, said roller 23 being located immediately behind the soil working members 15 with respect to the direction A. It will be realised that, when operating on heavy wet soils, there is some tendency for the roller 23 to sink into the surface thereof and, with very heavy loading of the roller 23, it could sink too far into the soil producing excessive compression thereof and/or adhesion of a lot of sticky soil to the roller and particularly to the open interior thereof.

Although various features of the soil cultivating implement or rotary harrow that has been described and illustrated in the accompanying drawings will be set forth in the following claims as inventive features, it is emphasised that the invention is not necessarily limited to those features and that it includes within its scope each of the parts of the soil cultivating implement or rotary harrow that has been described and/or that has been illustrated in the accompanying drawings both individually and in various combinations.

What I claim is:

1. A rotary harrow having a frame, said frame comprising a first and forward frame portion with coupling means for coupling said implement to a prime mover and a second, elongated frame portion located to the rear of said first frame portion, said second frame portion extending transverse to the direction of travel and a row of soil-working members being mounted on the second frame portion, drive means connected to rotate said soil-working members about upwardly extending axes, ground-engaging supporting roller means adjustably interconnected to the second frame portion at the rear thereof to control the working depths of said soil-working members, ground-engaging supporting wheel means being pivotably interconnected to an upper part of said first frame portion by rearwardly extending arm means and said wheel means providing additional support for the implement, said arm means being pivotably upwardly and downwardly relative to the first frame portion to change the amount of additional support for said implement, setting means linking said arm means to a lower part of said first frame portion and retaining said wheel means in a chosen supporting position relative to said first frame portion, said first and second frame portions being linked to one another and vertically displaceable with respect to one another during operation.

2. An implement as claimed in claim 1, wherein said arm means includes at least one arm which is inclined downwardly and rearwardly with respect to the normal direction of travel and a ground wheel is connected at the rear of said arm.

3. An implement as claimed in claim 2, wherein said arm means includes an arm positioned adjacent each of the opposite lateral sides of the implement and a ground wheel is mounted at the rear end of each arm.

4. An implement as claimed in claim 3, wherein there are two arms which are angularly adjustable, in common, relative to said first frame portion and said ground wheel are located substantially in line with one another when the implement is viewed in side elevation.

5. An implement as claimed in claim 1, wherein the connection between said first and second frame portions comprises a parallelogram linkage, said parallelogram linkage comprising two sets of links positioned in spced apart relationship 6. An implement as claimed in claim 1, wherein said supporting member is connected to said first frame portion by an arm and stop means interconnects the arm with said second frame portion to limit the downward movement of the second frame portion relative to said first frame portion when the implement is lifted in transport position.

7. An implement as claimed in claim 1, wherein said first frame portion mounts a mechanism for applying material to the soil, said mechanism comprising a hopper that extends transverse to the direction of normal travel and means dispensing material from said hopper including a plurality of delivery members mounted on said hopper.

8. An implement as claimed in claim 7, wherein outlet ends of said delivery members are supported on said frame at locations to the rear of said second frame portion and a common support on said frame mounts all of the delivery members, said common support extending adjacent said supporting means.

9. An implement as claimed in claim 7, wherein said wheel means includes two supporting ground wheels and said hopper has an internal rotatable delivery member drivenly connected to said ground wheels by a transmission between each ground wheel and said delivery member, said transmission comprising a shaft having univeral joints at its opposite ends.

10. A rotary harrow having a frame, said frame comprising a first and forward frame portion with coupling means for coupling said implement to a prime mover and a second, elongated frame portion located to the rear of said first frame portion, said second frame portion extending transverse to the direction of travel and a row of soil-working members being mounted on the second frame portion, drive means connected to rotate said soil-working members about upwardly extending axes, a ground-engaging supporting roller adjustably interconnected to the second frame portion at the rear thereof to control the working depths of said soil-working members, ground-engaging supporting wheels being pivotably interconnected to an upper part of said first frame portion by corresponding rearwardly extending arms and said wheels being positioned at the rear of said roller, said wheels providing additional support for the implement that can be changed by pivoting said arms upwardly and downwardly about a substantially horizontal axis relative to the first frame portion, setting links interconnecting the lower part of said first frame portion to lug means on said arms and retaining said wheels in a chosen supporting position relative to said first frame portion, the first and second frame portions being linked to one another and vertically displaceable with respect to one another during operation.

* * * * *